United States Patent [19]
Takahashi

[11] Patent Number: 6,124,020
[45] Date of Patent: Sep. 26, 2000

[54] MAGNETIC RECORDING MEDIUM AND PRODUCTION METHOD THEREOF

[76] Inventor: Migaku Takahashi, 20-2, Hitokida 2-chome, Taihaku-ku, Sendai-shi, Miyagi-ken, 982-02, Japan

[21] Appl. No.: 09/068,826
[22] PCT Filed: Nov. 15, 1996
[86] PCT No.: PCT/JP96/03364
§ 371 Date: Oct. 15, 1998
§ 102(e) Date: Oct. 15, 1998
[87] PCT Pub. No.: WO97/18556
PCT Pub. Date: May 22, 1997

[30] Foreign Application Priority Data

Nov. 16, 1995 [JP] Japan ..................... 7-298748

[51] Int. Cl.⁷ ..................................................... G11B 5/66
[52] U.S. Cl. ............... 428/141; 428/694 T; 428/694 TS; 428/694 ST; 428/900; 428/65.3; 427/128; 427/129; 427/130; 204/192.2
[58] Field of Search ........................... 428/694 T, 694 TS, 428/694 ST, 634 SG, 900, 141, 65.3; 427/128–130; 204/192.2

[56] References Cited

U.S. PATENT DOCUMENTS 6,042,838  3/2000  Takahashi ............................. 428/332

FOREIGN PATENT DOCUMENTS

| 0817174 A1 | 1/1998 | European Pat. Off. . |
| 0817175 A1 | 1/1998 | European Pat. Off. . |
| 4-366417 | 12/1992 | Japan . |
| 6-01184 | 7/1994 | Japan . |
| 08115516 | 5/1996 | Japan . |

OTHER PUBLICATIONS

8405 Journal of Magnetism and Magnetic Material, 135 (1994) Jul. 1, No. 1, pp. 1134–1135, Amsterdam, NL, Investigations of Compositional Separation . . . Media (2 Sheets).

931 Journal of Applied Physics, 76 (1994) Dec. 15, No. 12, pp. 2314–2316, Woodbury,NY, USA Materials and Processing Aspects of CoCrTa/Cr . . . Properties (3 Sheets).

*Primary Examiner*—Leszek Kiliman
*Attorney, Agent, or Firm*—Randall J. Knuth

[57] ABSTRACT

A magnetic recording medium comprising a smooth recording layer constituted of magnetic particles having a small size, which has a high coercive force. The magnetic recording medium comprises a substrate body, a Cr undercoat with an oxygen content of 100 wt ppm or less, and ferromagnetic metal made of CoCrTa having an oxygen content of 100 wt ppm or less, and which utilizes magnetic inversion. The ferromagnetic metal layer comprises 14 to 23 atm % chromium(Cr), 2 to 8 atom % tantalum(Ta) and the balance of cobalt(Co).

14 Claims, 4 Drawing Sheets

F I G . 3
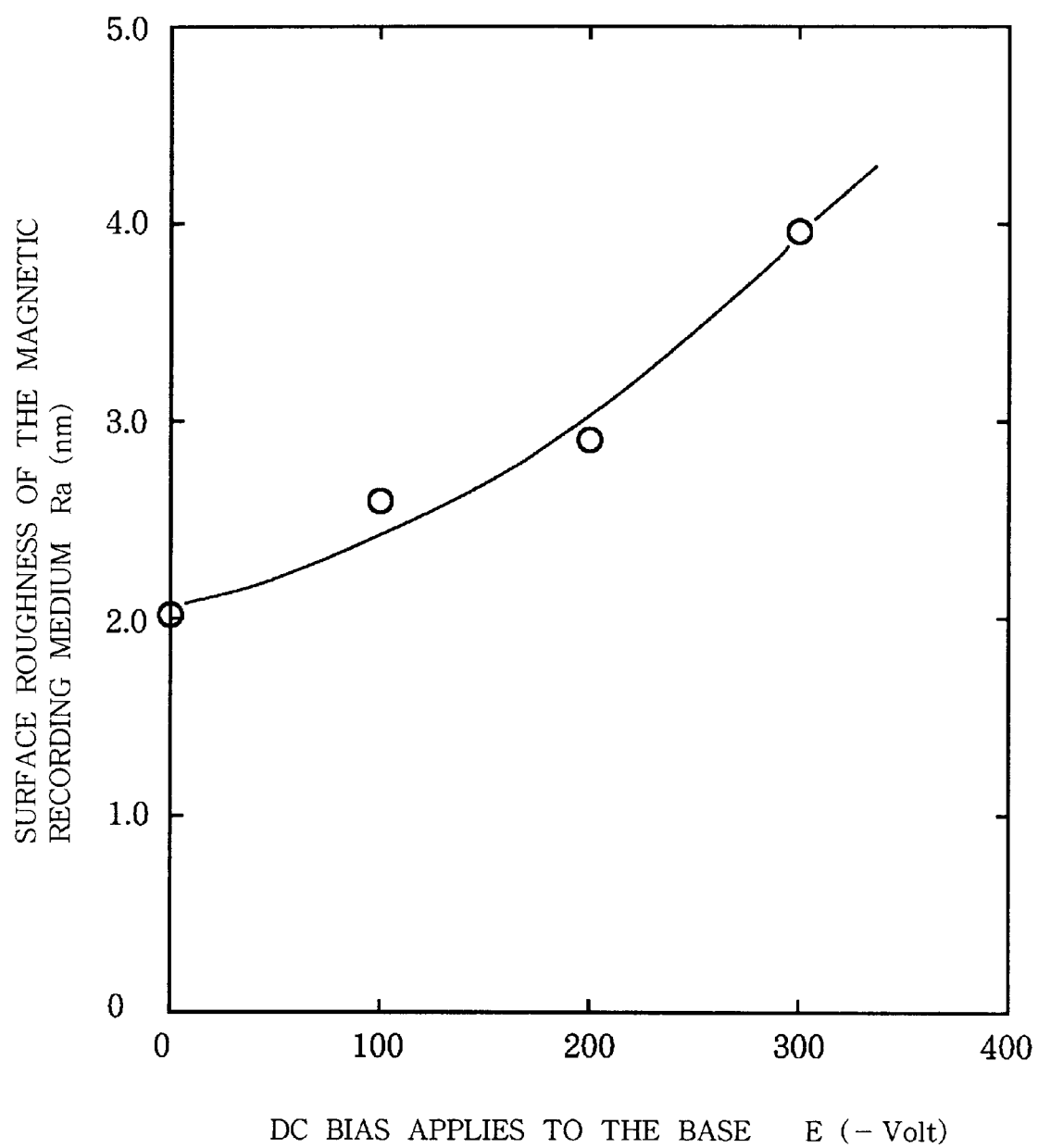

MAGNETIC RECORDING MEDIUM AND PRODUCTION METHOD THEREOF

TECHNOLOGICAL FIELD

The present invention relates to a magnetic recording medium and to a production method thereof. In greater detail, the present invention relates to a magnetic recording medium and a production method thereof which is capable of achieving a high recording density irrespective of the electrical properties of the substrate body.

BACKGROUND ART

Conventionally, the following technologies are known for magnetic recording media.

(1) In international application PCT/JP94/01184, it is disclosed that in a magnetic recording medium formed by means of a sputtering formation method in an ultraclean atmosphere (having an attained vacuum degree of $10^{-9}$ Torr or less), it is possible to limit the amount of oxygen contained in the undercoat and the magnetic layer comprising the magnetic recording medium to 100 wt.ppm or less, and because it is possible to limit the exchange interaction of the crystalline particles comprising the magnetic layer, the magnetic characteristics (the coercive force, and the normalized coercive force) and the storage and readout characteristics (S/N) are improved.

(2) It is well known that when ferromagnetic metal layers are laminated, by applying an electrical bias to the substrate body, the magnetic characteristics are improved. In particular, it has been reported by Okumura et al. that when the ferromagnetic metal layer comprises an alloy film consisting of CoCrTa, this effect is dramatic ("Substrate bias effect on the magnetization of a Co alloy/Cr thin film," Nippon Oyo Jiki Gakkai Gaiyoushu (1991), 413, p 413, 1991).

(3) It has been made clear by Iwabune et al. that in order to achieve an increase in the recording density of magnetic recording media, a magnetic recording medium having a small surface roughness is optimal ("Dependence of reproduction output on spacing in vertical two layer media", Nippon Oyo Jiki Gakkaishi, Volume 16, p. 105, 1992). That is to say, the small surface roughness of the magnetic recording medium realizes a lessening of the distance at which the head floats. As a result, the reproduced signal increases, so that this indicates that it would be possible to conduct readout of smaller recording bits.

(4) It is commonly known that in order to achieve an increase in the recording density of magnetic recording media, it is necessary to reduce medium noise (Nm). That is to say, it is important to increase the S/Nm ratio (reproduction signal (S)), and in order to accomplish this, it is necessary to reduce the magnetization transition region produced between adjacent storage bits. A method in which the recording layer is formed from magnetic particles having a small diameter has been disclosed by Nakai et al. as a way of accomplishing this ("Effect of Microstructure on Media Noise of CoCrTa Thin Film Media Fabricated under Ultra-Clean Sputtering Process", 1995 IEEE International Magnetics Conference Digests of the Technical Papers, JA-05, 1995).

However, when the technique described in (2) above is employed, the surface roughness of the magnetic recording medium is large, and there is a tendency for the diameter of the magnetic particles to become disarranged and chaotic. This tendency is identical when the technique described in (1) above is employed. As a result, it is difficult to produce a magnetic recording medium having a small head float distance and having low medium noise.

Accordingly, the development of a magnetic recording medium, and a manufacturing method thereof, having a small surface roughness and having a recording layer which is formed from magnetic particles having a small diameter, is desirable from the point of view of furthering an increase in the recording density of magnetic recording media.

The present invention has as an object thereof to provide a magnetic recording medium and a manufacturing method thereof, comprising a recording layer comprising magnetic particles having a small diameter and having a small surface roughness, and having a high coercive force.

DISCLOSURE OF THE INVENTION

The magnetic recording medium of the present invention comprises a ferromagnetic metal layer comprising CoCrTa having an oxygen concentration of 100 wt.ppm or less provided on a substrate body via a metallic undercoat, wherein the composition of said ferromagnetic metal layer contains 14–23 atm % of chromium (Cr), 2–8 atm % of tantalum (Ta) and the balance of cobalt (Co).

When a magnetic recording medium is formed by providing a ferromagnetic metal layer comprising CoCrTa having an oxygen content of 100 wt.ppm or less via a metallic undercoat on a substrate body layer, by means of formation in an ultraclean atmosphere, by setting the composition of the ferromagnetic metal layer so as to comprise 14–23 atm % chromium (Cr), 2–8 atm % tantalum (Ta), and the balance of cobalt (Co), it is possible to effectively segregate the Cr to the intergranular boundary, and to form a nonmagnetic granular boundary layer, and it is thus possible to obtain a ferromagnetic metal layer comprising magnetic particles having a high degree of magnetic isolation without applying a substrate bias. As a result, it is possible to promote the segregation of the Cr to the intergranular boundary without greatly reducing the saturation magnetization and anisotropic magnetic field of the ferromagnetic metal layer, so that it is possible to obtain a magnetic recording medium having low noise which is optimal for an increase in recording density.

In particular, when the amount of Cr contained is within a range of 14–23 atm %, it is possible to provide a coercive force of 2000 Oe or more, and to reduce the medium noise Nm to less than one half that in the case of a conventional CoCrTa medium (where Cr: 10.5 atm %, Ta: 4 atm %, the remainder being Co). Ta is added in order to promote the segregation of the Cr; the minimum amount of Ta at which this phenomenon can be observed has been experimentally determined to be 2 atm %. Furthermore, when Ta is present at a level of more than 8 atm %, the structure of the magnetic layer changes greatly, becoming locally amorphous, and as a result, the coercive force drops precipitously. Accordingly, the optimal amount of Ta contained is within a range of 2–8 atm %.

Furthermore, when at least a ferromagnetic metal layer is produced, a magnetic recording medium having a small surface roughness appropriate for an increase in recording density can be obtained by means of a manufacturing method for magnetic recording medium in which an electrical bias is not applied to the substrate body at least during the production of the ferromagnetic metal layer.

Hereinbelow, embodied modes of the present invention will be explained with reference to the figures.

Substrate Body

Examples of the substrate body in the present invention include, for example, aluminum, titanium, and alloys thereof, silicon, glass, carbon, ceramics, plastic, resins, and composites thereof, as well as such materials having on the surface thereof a nonmagnetic film of a different material executed by means of a surface coating treatment employing a sputtering method, a vapor deposition method, a plating method, or the like. In particular, in the present invention, the substrate body may be either electrically conducting or insulating, since good magnetic characteristics may be obtained without the application of an electrical bias to the substrate body.

The nonmagnetic film provided on the surface of the substrate body described above should not magnetize at high temperatures, should be conductive, and should be easily mechanically worked and the like, but should also have an appropriate degree of surface hardness. An example of a nonmagnetic layer meeting these conditions is (Ni—P) film produced by means of, for example, a sputtering method, or a plating method, which is preferentially employed.

With respect to the shape of the substrate, in the case of use as a disc, a circular doughnut shaped plate may be employed. The substrate body provided with a magnetic layer and the like described hereinbelow, that is to say, the magnetic recording medium, is employed while rotating about an axis at the center of the plate at a speed of, for example, 3600 rpm, during magnetic recording and reproduction. At this time, the magnetic head rides above the magnetic recording medium at a height of approximately 0.1 micrometer. Accordingly, it is necessary to appropriately control the flatness of the surface, the parallelness of the front and back surfaces, deformation in the circumferencial direction of the substrate body, and the surface roughness thereof.

Furthermore, when the substrate body is rotated or stopped, the magnetic recording medium and the magnetic head come into contact and rub against each other at the surfaces thereof (contact start stop, termed CSS). As a countermeasure, there are cases in which concentric light scratches (texturing) are provided in the surface of the substrate body.

Metallic Undercoat

Examples of the metallic undercoat in the present invention include, for example, Cr, Ti, W, and alloys thereof. In the case in which an alloy is employed, combinations with, for example, V, Nb, Ta, and the like, can be proposed. In particular, Cr is preferable since it causes a segregation effect with respect to the ferromagnetic metal layer described hereinbelow. Furthermore, it is widely used in mass production, and the sputtering method, the vapor deposition method, or the like may be employed as the formation method thereof.

With respect to the role of the metallic undercoating, this serves to promote crystal growth of the ferromagnetic metal layer when a ferromagnetic metal layer comprising Co as a substrate body is provided thereon, so that the magnetization easy axis of the ferromagnetic metal layer will lie within the plane of the substrate body, in other words, so that the coercive force in a direction within the plane of the substrate body will be high.

When a metallic undercoat comprising Cr is formed by means of a sputtering method, examples of film formation elements which control the crystalline state thereof include, for example, the surface form of the substrate body, the surface state, or the surface temperature, the gas pressure during formation, a bias applied to the substrate body, and the thickness of the film formed, and the like. In particular, there is a tendency for the coercive force of the ferromagnetic metal layer to increase in proportion to the thickness of the Cr film, so that conventionally, the Cr film thickness was within a range of 50 nm–150 nm.

However, when the thickness of the Cr film described above is great, there is a tendency for the surface roughness of the medium to increase, and it is thus difficult to reduce the float distance of the magnetic head from the surface of the medium, and this interferes with a further increase in recording density. In order to solve this problem, in the present invention, a ferromagnetic metal layer described hereinbelow is provided on an ultrathin Cr film (for example, 2.5 nm), and a high coercive force is realized thereby, so that it is possible to realize superior magnetic characteristics simultaneously with a stable reduction in the float height of the head.

Here, what is meant by conventional film formation conditions (film formation conditions of the present invention) is conditions in which the background pressure of the film formation chamber is $10^{-7}$ ($10^{-9}$) Torr, and the impurity concentration of the Ar gas employed during film formation is 1 ppm or more (100 ppt or less, and preferably 10 ppb or less). Furthermore, the target employed during the formation of the metallic undercoat should preferably have an impurity concentration of 150 ppm or less.

Furthermore, when the metallic undercoat is formed while applying a bias to the substrate body, the surface roughness of the metallic undercoat becomes large, and as a result of the effects thereof, the surface roughness of the medium also becomes large. Accordingly, it is preferable that a bias either not be applied, or be reduced to the minimum possible value, during the formation of the metallic undercoat.

Ferromagnetic Metal Layer

The ferromagnetic metal layer in accordance with the present invention is appropriately employed in cases in which it is provided on the surface of the substrate body via the metallic undercoat described above (that is to say, in the case of a metallic layer for recording within the surface); examples thereof include, for example, CoNiCr, CoCrTa, CoCrPt, CoNiPt, CoNiCrTa, CoCrPtTa, and the like. Among these, CoCrTa, which is widely produced as a low noise medium, and which is a material system having an intergranular layer having a noncrystalline (amorphous) structure between crystalline particles, is optimal.

In particular, in the film formation conditions of the present invention, which involve an ultraclean atmosphere in comparison to the conventional film formation conditions, when the CoCrTa film comprises 15–23 atm % chromium (Cr), 2–8 atm % tantalum (Ta), and a balance of cobalt (Co), even if an electrical bias is not applied to the substrate body, a high coercive force of 2000 Oe or more can be obtained, and a magnetic recording medium having a small surface roughness may be formed. Furthermore, the same trends were confirmed in the case of CoNiCrTa, and CoCrPtTa as well.

Here, what is meant by conventional film formation conditions (film formation conditions of the present invention) are conditions in which the background pressure of the film formation chamber is $10^{-7}$ ($10^{-9}$) Torr, and the impurity concentration of the Ar gas used during film formation is 1 ppm or more (100 ppt or less, and preferably 10 ppb or less). Furthermore, the target employed during the formation of the ferromagnetic metal layer should have an impurity concentration of 30 ppm or less.

Magnetic Recording Medium Employing Magnetic Inversion

Examples of the "magnetic recording medium employing magnetic inversion" of the present invention include media in which recording magnetization is formed parallel to the surface of the ferromagnetic metal layer described above (in-plane magnetic recording medium). In this type of medium, in order to improve the recording density, it is necessary to achieve a further reduction in size of the recording magnetization. Since this reduction in size reduces the recording magnetization leakage flux, this reduces the reproduction signal output at the magnetic head. Accordingly, it is hoped that the medium noise, which is thought to result from the effects of adjacent recording magnetization, will be further reduced.

Oxygen Concentration in the Ferromagnetic Metal Layer

In the present invention, the "oxygen concentration in the ferromagnetic metal layer" is optimally 10 wt.ppm or less. It is disclosed in international application PCT/JP94/01184 that by means of limiting the oxygen concentration in this way, the coercive force of the medium is increased, and the medium noise is reduced. What is meant by the sputtering method used for forming the ferromagnetic metal layer having such an oxygen concentration is film formation under the following conditions: the attained degree of vacuum in the film formation chamber used for forming the ferromagnetic metal layer is on the level of $10^{-9}$ Torr, and the impurity concentration in the Ar gas used during the formation of the ferromagnetic metal layer is 100 ppt or less, and optimally 10 ppb or less.

On the other hand, this concentration is known to be 250 wt.ppm or more in the case of CoCrTa films formed by means of conventional sputtering methods. Here, what is meant by conventional sputtering methods is film formation under the following conditions: the attained degree of vacuum in the film formation chamber used for the formation of the ferromagnetic metal layer is on the level of $10^{-7}$ Torr, and the impurity concentration of the Ar gas used during the formation of the ferromagnetic metal layer is 1 ppm or more.

Oxygen Concentration in the Metallic Undercoat

In the present invention, the "oxygen concentration in the metallic undercoat" is optimally 100 wt.ppm or less. By means of limiting the oxygen concentration in this manner, it is possible to conduct crystal growth such that, even in cases in which the metallic undercoat comprises an ultrathin film (for example, a Cr film of 2.5 nm), the magnetization easy access of the ferromagnetic metal layer formed thereon lies within the plane. As a result, it is possible to ensure that the magnetic recording medium has sufficient magnetic characteristics, and simultaneously to limit the size of the surface roughness of the metallic undercoat. The fact that in accordance with this, the surface roughness of the magnetic recording medium is also reduced, and a low float height of the head becomes possible, is recorded in international application PCT/JP94/01184. What is meant by a sputtering method for formation of a metallic undercoat having such an oxygen concentration is film formation under conditions such that: the attained degree of vacuum in the film formation chamber used for formation of the metallic undercoat is on the level of $10^{-9}$ Torr, and the impurity concentration in the Ar gas used during the formation of the metallic undercoat is 100 ppt or less, and optimally 10 ppb or less.

On the other hand, it is known that this concentration is 250 wt.ppm or more in the case of Cr film produced by means of a conventional sputtering method. Here, what is meant by a conventional sputtering method is film formation under conditions such that: the attained degree of vacuum in the film formation chamber during the formation of the Cr film is on the level of $10^{-7}$ Torr and the impurity concentration of Ar gas used during formation of the Cr film is 1 ppm or more.

Coercive Force Hc of the Magnetic Recording Medium

What is meant by the coercive force Hc of the magnetic recording medium in the present invention is the resistance magnetic force of the medium determined from the magnetization curves measured using a vibrating sample magnetometer (termed a VSM). The coercive force Hc is a value measured within the plane of the thin film.

Aluminum Alloy

Examples of the aluminum alloy in the present invention include alloys comprising, for example, aluminum and magnesium. Currently, in hard disk applications, those using aluminum alloy as a substrate body are most commonly employed. Since the object of use is a magnetic recording use, it is preferable that the amount of metal oxides contained be small.

Furthermore, there are a number of cases in which a nonmagnetic (Ni—P) layer is provided by means of a plating method or sputtering method on the surface of the aluminum alloy. The purpose of doing this is to increase the corrosion resistance and the surface hardness of the substrate body. In order to reduce the abrasion force resulting when the magnetic head rubs against the surface of the medium, light concentric scratches (texturing) are provided in the surface of the (Ni—P) layer.

In particular, the use of a substrate body comprising an aluminum alloy having an average center line roughness Ra of 1 nm or less is preferable in order to reduce the surface roughness of the thin film formed thereon.

Glass

Examples of glass employed in the present invention include glass which has been subjected to strengthening treatment in which ion doping or the like of the glass surface has been conducted, and glass which itself comprises microcrystals. Both of these are ways to eliminate the weak point of glass, that it is "easily breakable."

Since glass has a surface hardness which is higher than that of aluminum alloy, it is not necessary to provide a (Ni—P) layer or the like, so that glass is superior in this respect. Furthermore, glass is also advantageous from the point of view of forming the substrate body as a thin plate, from the point of view of the smoothness of the substrate body surface, and from the point of view of the resistance of the substrate body to high temperatures.

In particular, in the present invention, even if an electrical bias is not applied to the substrate body, it is possible to obtain superior magnetic characteristics, so that it is possible to advantageously employ a substrate body comprising glass, which is commonly an insulating material. However, in order to produce a magnetic layer having a high coercive force, there are cases in which a nonmagnetic layer may be provided on the surface of the glass for the purpose of increasing the surface temperature of the substrate body during film formation. Furthermore, there are cases in which a nonmagnetic layer is provided in order to prevent the entry of harmful elements from the glass into the magnetic film. Alternatively, in order to reduce the friction force resulting from the rubbing of the magnetic head against the surface of the medium, there are cases in which a nonmagnetic layer having an extremely fine undulating shape is provided on the surface of the glass.

Silicon

Examples of the silicon employed in the present invention include, for example, silicon wafers formed into a disk shape, which are used in the semiconductor field.

In the same way as glass, silicon has a high surface hardness, and it is possible to form the substrate body into a thin plate shape, the smoothness of the substrate body surface is also high, and the resistance to high temperatures of the substrate body is good, so that in these respects it is superior to an aluminum alloy. In addition, it is possible to select the crystal orientation and the lattice constant of the substrate body surface, so that it is to be expected that the ability to control the crystal growth of the magnetic layer formed on this substrate body will improve. Furthermore, in the same manner as the aluminum alloy, the substrate body is conductive, so that it is possible to apply a bias to the substrate body, and since the release of gases such as $H_2O$ and the like from within the substrate body is slight, it is possible to achieve an increase in cleanliness of the film formation space, and this is advantageous.

Sputtering Method

Examples of the sputtering method employed in the present invention include, for example, conveyance type sputtering methods in which the thin film is formed while moving the substrate body in front of the target, and static type sputtering methods in which the substrate body is fixed in front of the target and the thin film is formed. The former is advantageous in the production of low cost media, since it is suitable for mass production, while the latter is capable of producing media having superior recording and playback characteristics, since the angle of incidence of the sputtering particles with respect to substrate body is stable. The latter method was employed in the embodiments of the present invention; however, the former method may also be employed.

Order of Formation of the Metallic Undercoat and the Ferromagnetic Metal Layer

In the present invention, what is meant by the "order of formation of the metallic undercoat and the ferromagnetic metal layer" is that "after the metallic undercoat has been formed on the surface of the substrate body, and until the ferromagnetic metal layer is formed on the surface thereof, there is no exposure to an atmosphere having a higher pressure than the gas pressure during film formation." After the surface of the metallic undercoat has been exposed to the ambient atmosphere, if a ferromagnetic metal layer is formed thereon, the coercive force of the medium is known to decline dramatically (for example, from a level of 1500 Oe with no exposure to a level of 500 Oe when there is exposure).

Impurities, and the Concentration Thereof, Present in the Ar Gas Used in Film Formation Examples of the "impurities present in the Ar gas used in film formation" in the present invention include, for example, $H_2O$, $O_2$, $CO_2$, $H_2$, $N_2$, $C_xH_y$, H, C, O, CO and the like. In particular, impurities which are thought to effect the amount of oxygen incorporated into the film are $H_2O$, $O_2$, $CO_2$, O, and CO. Accordingly, the impurity concentration in the present invention is expressed as the sum of the $H_2O$, $O_2$, $CO_2$, O, and CO contained in the Ar gas used in film formation.

Cleaning Treatment By Means of a High Frequency Sputtering Method

Examples of "cleaning treatment by means of a high frequency sputtering method" in the present invention include, for example, a method in which AC voltage from a RF (radio frequency, 13.56 MHz) source is applied to a substrate body positioned within a space having a gas pressure permitting discharge. The characteristic feature of such a method is that it may be applied even in cases in which the substrate body is nonconductive. Commonly, the effects of cleaning treatment include an increase in the adhesion of the thin film to the substrate body. However, there are many unclear points with respect to the effects exerted after cleaning treatment on the quality of the thin film itself which is formed on the surface of a substrate body.

Impurities, and the Concentration Thereof, in the Cr Target which is Employed During the Formation of the Metallic Undercoat In the present invention, examples of the "impurities in the Cr target employed during the formation of the metallic undercoat" include, for example, Fe, Si, Al, C, O, N, H, and the like. In particular, the impurity which is assumed to have an influence on the amount of oxygen incorporated into the film is O. Accordingly, the impurity concentration in the present invention is shown as the oxygen contained in the Cr target used during formation of the metallic undercoat.

Impurities, and Concentrations Thereof, in the Target Used During the Formation of the Ferromagnetic Metal Layer In the present invention, examples of the "impurities in the Co target used during the formation of the ferromagnetic metal layer" include, for example, Fe, Si, Al, Co, O, N, and the like. In particular, the impurity thought to affect the amount of oxygen incorporated in the film is O. Accordingly, the impurity concentration in the present invention is shown as the oxygen contained in the target used during formation of the ferromagnetic metal layer.

Negative Bias Applied to the Substrate Body

In the present invention, the "negative bias applied to the substrate body" indicates the application of a DC bias voltage to the substrate body during the formation of a Cr undercoat or a magnetic layer as a magnetic recording medium. In the conventional sputtering methods described above, it is known that if the appropriate bias voltage is applied, the coercive force of the medium can be increased. It is commonly known that the effect of this bias application is greater in the case in which such a bias is applied during the formation of both layers than in the case in which it is applied solely during the production of one or the other of the layers.

However, there are a number of cases in which the bias application described above acts on substances in the vicinity of the substrate body, that is to say, on the substrate body support member or the substrate body holder. As a result, gas or dust is generated in the space in the vicinity of the substrate body, and may be incorporated into the thin film during film formation, and a defective state is likely to be produced in which various film characteristics become unstable. Furthermore, the application of a bias to the substrate body has the following problems.

(1) Such a bias can not be applied to nonconductive substrate bodies such as glass and the like.

(2) The saturation flux density (Ms) of the magnetic film which is formed declines.

(3) It is necessary to provide complicated machinery within the film formation chamber.

(4) Changes occur easily in the degree of bias application to the substrate body, and as a result, undesirable variation is likely to be generated in the magnetic characteristics.

As a countermeasure, it is possible to eliminate the problems described above by using CoCrTa having the composition described in the present invention as the ferromagnetic metal layer. Accordingly, it is possible to obtain a magnetic recording medium which is capable of achieving a higher recording density.

Attained Degree of Vacuum in the Film Formation Chamber Used for Forming the Metallic Undercoat and/or Ferromagnetic Metal Layer In the present invention the "attained degree of vacuum in the film formation chamber used for forming the metallic undercoat and/or ferromagnetic metal layer" is one film formation element controlling the value of the coercive force in accordance with the material of the ferromagnetic metal layer. In particular, it is disclosed in international application PCT/JP94/01184 that conventionally, in Co based materials containing Ta within the ferromagnetic metal layer, in cases in which the attained degree of vacuum is low (for example, $5 \times 10^{-6}$ Torr or more), the effect thereof is large.

(Surface Temperature of the Substrate Body During Formation of the Metallic Undercoating and/or Ferromagnetic Metal Layer In the present invention, the "surface temperature of the substrate body during formation of the metallic undercoating and/or ferromagnetic metal layer" is one film formation element governing the value of the coercive force which does not depend on the material used for the ferromagnetic metal layer. It is possible to achieve a higher coercive force when film formation is conducted at higher surface temperatures, insofar as the temperature remains within a range which does not damage the substrate body. What is meant by damaging the substrate body is external changes such as swelling, cracking, or the like, or internal changes such as a generation of magnetization, an increase in the amount of gas released, or the like.

However, in order to realize a high substrate body surface temperature, it is commonly necessary to conduct some type of heating treatment, either in the film formation chamber or in a prechamber. This heating treatment has undesirable aspects in that gas or dust may be generated in the space in the vicinity of the substrate body, and this may be incorporated into the thin film during film formation, and this may lead to instabilities in various film characteristics.

Furthermore, the high substrate body surface temperature involves the following problems.

(1) The nonmagnetic NiP layer in a NiP/Al substrate body may be magnetized.

(2) Warping is generated in the substrate body.

(3) In substrate bodies having low heat conductivity such as glass and the like, it is difficult to raise the temperature of the substrate body and to maintain such a temperature.

Accordingly, a production method which makes it possible to obtain the desired film characteristics either without conducting such heat treatment, or by conducting comparatively low-temperature heat treatment, has been desired.

Surface Roughness Ra of the Substrate Body

Examples of the surface roughness of the substrate body in the present invention include the average center line roughness Ra in the case in which the surface of a substrate body having a disk shape is measured in the radial direction. The TALYSTEP produced by Rank Taylor Hobson Corporation was used as the measuring instrument.

When the substrate body begins to rotate from a stopped state, or in the opposite case, the surfaces of the magnetic recording medium and the magnetic head come into contact and rub against one another (contact start stop, termed CSS). At this time, in order to suppress an increase in the adhesion of the magnetic head or the coefficient of friction, it is preferable that Ra be larger. On the other hand, when the substrate body has reached maximum rotation, it is necessary to maintain a space between the magnetic recording medium and the magnetic head, in other words, it is necessary to guarantee the float height of the magnetic head, so that a low value of Ra is desirable.

Accordingly, the maximum and minimum values of the surface roughness Ra of the substrate body are appropriately determined from the use and the required specifications relating to the magnetic recording medium. For example, when the float height of the magnetic head is two microinches, Ra should be within a range of 6 nm–8 nm.

However, in order to achieve a further increase in recording density, it is necessary to further reduce the float height of the magnetic head (the distance by which the magnetic head is separated from the surface of the magnetic recording medium during the recording and playback operations). In order to achieve this, it is important to further flatten the surface of the magnetic recording medium. For this reason, it is desirable to further reduce the surface roughness of the substrate body.

In the present invention, conditions were considered under which superior magnetic characteristics could be obtained even when a substrate body having a Ra value of 0.5 nm was employed.

Texturing Treatment

Examples of the texturing treatment in the present invention include, for example, methods employing mechanical polishing, methods employing chemical etching, and methods providing a physically undulating film. In particular, when an aluminum alloy substrate body, which is the most widely employed type of substrate body, is used as the substrate body of the magnetic recording medium, the method employing mechanical polishing is adopted. For example, by applying a tape, having deposited on the surface thereon an abrasive grain for grinding, to a (Ni—P) film provided on the surface of an aluminum alloy substrate body while the substrate body is rotating, concentric light scratches are produced. In this method, there are cases in which the abrasive grain used for grinding is employed in a manner in which it is separated from the tape.

However, for the reasons described under the heading "Surface Roughness of the Substrate body" above, a production method is desirable which makes it possible to obtain a variety of desired film characteristics even without conducting the texturing treatment described above or in a more lightly textured state.

Composite Electropolishing Treatment

Examples of a composite electropolishing treatment of the present invention include, for example, treatment in which an oxide passivated film having chromium oxides as a component thereof is provided on the inner walls of the vacuum chamber used for formation of the magnetic film and the like. In this case, it is desirable that the material used for the inner walls of the vacuum chamber comprise, for example, SUS316L or the like. By means of this treatment, it is possible to reduce the amount of $O_2$ and $H_2O$ emitted from the inner walls of the vacuum chamber, so that it is possible to further reduce the amount of oxygen incorporated into the thin film produced.

The magnetron sputtering apparatus produced by Anerba (number ILC3013: load lock static opposed type) used in the present invention has the above treatment conducted on the inner walls of all of the vacuum chambers thereof (the loading/extraction chamber, the film formation chambers, and the cleaning chamber).

BRIEF DESCRIPTION OF THE DRAWINGS

FIG. 3 is a graph showing the relationship between the surface roughness Ra of a magnetic recording medium in accordance with a third embodiment of the present invention and the direct current bias applied to the substrate body.

BEST MODE FOR CARRYING OUT THE INVENTION

Figure 1:
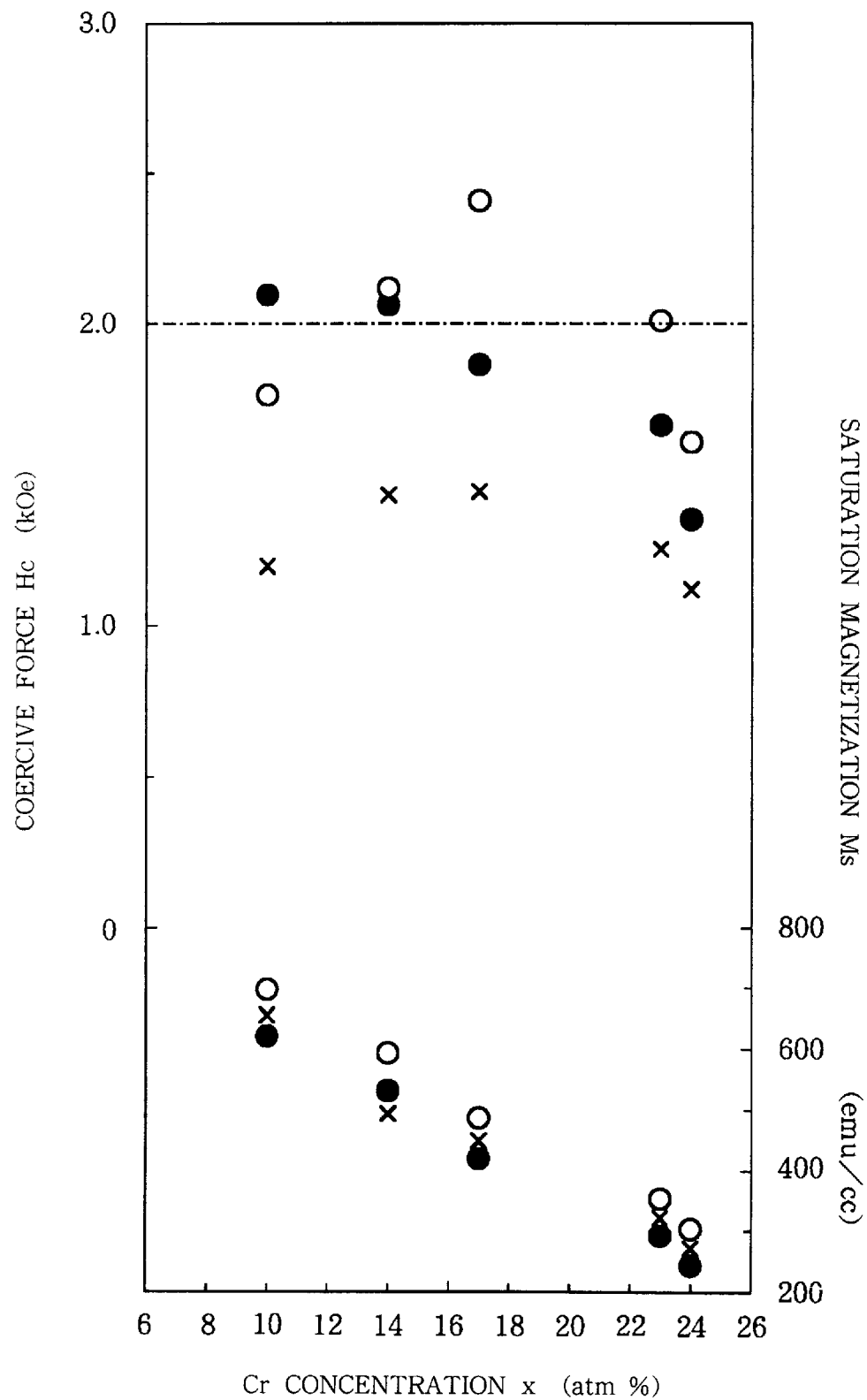
FIG. 1 is a graph showing the relationship between the coercive force Hc and the saturation magnetization Ms, and the Cr concentration in the CoCrTa film, of a magnetic recording medium in accordance with a first embodiment of the present invention.

Hereinbelow, the present invention will be explained in detail using embodiments; however, the present invention is in no way restricted to the embodiments described.

Embodiment 1

In the present embodiment, a ferromagnetic metal layer comprising $(Co_{96-x}Cr_xTa_4)$ [atm %] was laminated on a substrate body comprising an Al—Mg alloy plate having a NiP plating executed thereon, via a metallic undercoating comprising a Cr film, by means of a sputtering method, and thereby a magnetic recording medium was produced.

The Cr concentration x in the ferromagnetic metal layer was altered within a range of 10–24 [atm %].

Furthermore, in order to conduct a comparison with conventional film formation conditions, the attained degree of vacuum within the film formation chamber in which the ferromagnetic metal layer was formed was altered. The attained degree of vacuum within the film formation chamber used for forming the ferromagnetic metal layer was set to two values: approximately $10^{-9}$ Torr and approximately $10^{-7}$ Torr.

Furthermore, the DC bias applied to the substrate body during film formation of the Cr and the CoCrTa had two values: 0 and 200 (−Volt).

At this time, the impurity concentration contained in the Ar gas during formation of the ferromagnetic metal layer and the metallic undercoat was set at 10 ppb.

In the present embodiment, the sputtering apparatus used in production of the media was a magnetron sputtering device produced by Anerba (number ILC3013: load lock static opposed type), and the inner walls of all the vacuum chambers thereof (the load/extraction chamber (and cleaning chamber), film formation chamber 1 (in which the metallic undercoat was formed), film formation chamber 2 (in which the ferromagnetic metal layer was formed), and film formation chamber 3 (in which the protective layer was formed)), were subjected to composite electropolishing treatment. Table 1 shows the film formation conditions during production of the magnetic recording medium of the present embodiment.

TABLE 1

| Item | Set Values |
| --- | --- |
| 1) Substrate body material | Al—Mg alloy (having thereon a 10-micron (Ni—P) plated film) |
| 2) Diameter and shape of the substrate body | 89 mm, disc-shaped |
| 3) Surface form of the substrate body | No texturing, Ra <1 nm |
| 4) Attained vacuum degree (Torr) | $10^{-7}$ or $10^{-9}$ (film formation chamber 2) $5 \times 10^{-9}$ (except in film formation chamber 2) |
| 5) Impurity concentration in the Ar gas | 10 ppb (same in all chambers) |
| 6) Ar gas pressure (mTorr) | 2 (same in all chambers) |
| 7) Temperature (° C.) at which the substrate body surface is maintained | 250 (same in all chambers) |
| 8) Target material (at %) | Cr, $Co_{96-x}Cr_xTa_4$, C |
| 9) Diameter of the target (inches) | 6 |
| 10) Impurity concentration in the target (ppm) | 120 (Cr), 20 (CoCrTa) 35 (Cr, CoCrTa, C) |
| 11) Distance between target and substrate bddy (min) | DC, 200 (Cr, CoCrTa) DC, 400 (C) |
| 12) Power (W) applied to the target | 0 or 200 (Cr, CoCrTa) 0 (C) |
| 13) DC bias (−Volt) applied to the substrate body during film formation | 2.5 (Cr), 16–28 (CoCrTa), 10 (C) |
| 14) Film thickness produced (nm) Substrate body cleaning treatment conditions | |
| 15) Power (W) applied to the substrate body | 200 |
| 16) Treatment time (sec) | 10 |
| 17) Ar gas pressure (mTorr) | 2 |

Hereinbelow, the production method of the magnetic recording medium of the present invention will be explained in order of the processes thereof. The numbers in parentheses below indicate this order.

(1) An aluminum alloy plate having a disc shape such that the inner and outer diameters were 25 mm/89 mm, and the thickness thereof was 1.27 mm, was employed as the substrate body. An (Ni—P) film having a thickness of 10 microns was provided on the surface of this aluminum alloy plate by means of a plating method. The surface of the (Ni—P) film was worked using a mechanical method so as to attain a flat state without providing concentric light scratches (texturing), and the surface roughness of the substrate body when scanned in the radial direction of the disk was such that the average centerline roughness Ra was less than 1 nm.

(2) The substrate body described above was subjected to a washing treatment using mechanical and chemical methods, and to a drying treatment using hot air or the like, prior to the subsequent film formation.

(3) After the drying treatment had been completed, the substrate body was set in a substrate body holder comprising aluminum which was disposed in the load chamber of the sputtering apparatus. The interior of the load chamber was evacuated using a vacuum exhaust device to an attained degree of vacuum of $3 \times 10^{-9}$ Torr, and then, the substrate body was subjected to a heating treatment for a period of 5 minutes and at a temperature of 250° C. using an infrared lamp.

(4) The substrate body holder described above was moved from a load chamber to a cleaning chamber. After being moved, the substrate body was maintained at a temperature of 250° C. using an infrared lamp.

(5) Ar gas having an impurity concentration of 10 ppb was introduced into the cleaning treatment chamber, and the gas pressure was set to 2 mTorr.

(6) A voltage was applied from a RF power source to the substrate body described above, and a cleaning treatment was conducted. The conditions thereof were as follows: the power applied to the substrate body was 200 W (a power density of 2.5 W/cm$^2$, and a cleaning speed of 0.013 nm/sec), and the cleaning treatment time was fixed at 10 seconds.

(7) The substrate body holder described above was then moved from the cleaning treatment chamber to a film formation chamber 1 used for production of the Cr film. After being moved, the substrate body was maintained at a temperature of 250° C. using an infrared lamp. However, film formation chamber 1 was evacuated in advance to an attained degree of vacuum of 3×10$^{-9}$ Torr, and after the substrate body holder had been moved, a door valve between the cleaning treatment chamber and the film formation chamber 1 was closed. The impurity concentration in the Cr target used was 120 ppm.

(8) Ar gas was introduced into film formation chamber 1, and the gas pressure of film formation chamber 1 was set to 2 mTorr. The impurity concentration of the Ar gas used was set at 10 ppb.

(9) A voltage of 200 W was applied from a direct current power source to the Cr target, and a plasma was generated. As a result, the Cr target was caused to sputter, and a Cr layer having a thickness of 2.5 nm was formed on the surface of the substrate body, which was positioned parallel to and opposite from the target.

(10) After the formation of the Cr layer, the substrate body holder was moved from the film formation chamber 1 to a film formation chamber 2, used for the production of a CoCrTa film. After being moved, the substrate body was maintained at a temperature of 250° C. using an inferred lamp. However, the conditions were varied with respect to the attained degree of vacuum of film formation chamber 2 prior to formation. Two conditions were used: a case in which evacuation was conducted to a level of 3×10$^{-9}$ Torr, and a case in which evacuation was conducted to a level of 1×10$^{-7}$ Torr. Furthermore, after the substrate body holder had been moved, a door valve between film formation chamber 1 and film formation chamber 2 was closed. The composition of the target employed was set to (Co$_{96-x}$Cr$_x$Ta$_4$) where x varied within a range of 10–24 (atm %), and the impurity concentration in the target was set to 20 ppm.

(11) Ar gas was introduced into film formation chamber 2, and the gas pressure within film formation chamber 2 was set to 2 mTorr. The impurity concentration in the Ar gas employed was set to 10 ppb.

(12) A voltage of 200 W was applied from a direct current power source to a CoCrTa target, and a plasma was generated. As a result, the CoCrTa target was caused to sputter, and CoCrTa layers having thicknesses within a range of 16–28 nm were formed on the surface of the substrate body provided with a Cr layer, which was parallel and in opposition to the target.

(13) After formation of the CoCrTa layer, the substrate body holder was moved from film formation chamber 2 to a film formation chamber 3, which was used for production of a C film. Even after being moved, the substrate body was maintained at a temperature of 250° C. using an inferred lamp. However, film formation chamber 3 was evacuated to an attained vacuum degree of 3×10$^{-9}$ Torr in advance, and after moving the substrate body holder, a door valve between film formation chamber 2 and film formation chamber 3 was closed.

(14) Ar gas was introduced into film formation chamber 3, and the gas pressure within film formation chamber 3 was set to 2 mTorr. The impurity concentration in the Ar gas employed was set to 10 ppb.

(15) A voltage of 400 W was applied from a direct current power source to a C target, and a plasma was generated. As a result, the C target was caused to sputter, and a C layer having a thickness of 10 nm was formed on the surface of the substrate body, which was provided with a CoCrTa layer and a Cr layer, and which was positioned parallel and in opposition to the target.

(16) After the formation of the C layer, the substrate body holder was moved from the film formation chamber 3 to an extraction chamber. After this, N$_2$ gas was introduced into the extraction chamber, atmospheric pressure was established, and then the substrate body was removed. By means of procedures (1)–(12) above, a magnetic recording medium having the layered structure of C/CoCrTa/Cr/NiP/Al was formed.

The targets employed had extremely restricted impurity levels. The impurities present in the target use for Cr formation were as follows: Fe: 88, Si: 34, Al: 10, C: 60, O: 120, N: 60, H: 1.1 (wt.ppm). Furthermore, the composition of the target used for the formation of the ferromagnetic metal layer was such that Cr: 10–24 at %, Ta: 4 at %, and Co comprised the balance, while the impurities therein were such that Fe: 27, Si<10, Al<10, C: 30, O: 20, and N>10 (wt.ppm).

In FIG. 1, the magnetic characteristics of the media produced are shown. The horizontal axis in FIG. 1 indicates the Cr concentration of the CoCrTa film. The measurement of this Cr concentration was conducted by means of SIMS. The vertical axis in FIG. 1 indicates the saturation magnetization Ms (emu/cc) and the coercive force Hc (Oe) in the circumferencial direction of the sample. In FIG. 1, the meaning of the ○ symbol, the ● symbol, and the × symbol are as given in Table 2 below.

TABLE 2

| Symbol | Attained Vacuum Degree (Torr) in Film Formation Chamber 2 | Bias [−V] During Formation of the Cr and CoCrTa Films |
|---|---|---|
| ○ | 3 × 10$^{-9}$ | 0 |
| ● | 3 × 10$^{-9}$ | 200 |
| X | 1 × 10$^{-7}$ | 0 |

The following three points are clear from FIG. 1.

(1) In the case in which the atmosphere was ultraclean and a bias was not applied (○ symbol), when the Cr concentration in CoCrTa film (in atm %) was within a range of 14–23, a magnetic recording medium having a coercive force of 2000 Oe or more was obtained.

(2) When film formation was conducted in an ultraclean atmosphere (○ symbol), a coercive force was obtained which was dramatically higher than that obtained by film formation in a conventional atmosphere (× symbol).

(3) When a bias was not applied (○ symbol) the coercive force which was obtained was higher than that obtained when a bias was applied (● symbol).

Accordingly, in a magnetic recording medium employing reversal of magnetization which is provided with a ferromagnetic metal layer comprising CoCrTa having an oxygen content of 100 wt.ppm or less, provided on a substrate body via a metallic undercoat comprising Cr having an oxygen concentration of 100 wt.ppm or less, by means of setting the composition of the ferromagnetic metal layer to chromium (Cr) within a range of 14–23 atm %, tantalum (Ta) at 4 atm %, the balance comprising cobalt (Co), it is possible to obtain a magnetic recording medium having superior magnetic characteristics without applying a bias to the substrate body.

Embodiment 2

In the present embodiment, a ferromagnetic metal layer comprising ($Co_{83-y}Cr_{17}Ta_y$) [atm %] was laminated on a substrate body comprising a Al—Mg alloy plate having a NiP plating executed thereon, via a metallic undercoat comprising a Cr film, using a sputtering method, and a magnetic recording medium was thus obtained.

The Ta concentration y in the ferromagnetic metal layer was altered within a range of 0–9 [atm %].

The other points were identical to those in Embodiment 1.

Table 3 shows the film formation conditions during production of the magnetic recording medium of the present embodiment; only the composition of the ferromagnetic metal layer differs from that of Embodiment 1. The production method for the magnetic recording medium of the present embodiment was identical to that of Embodiment 1.

TABLE 3

| Item | Set Values |
| --- | --- |
| 1) Substrate body material | Al—Mg alloy (having thereon a 10-micron (Ni—P) plated film) |
| 2) Diameter and shape of the substrate body | 89 mm, disc-shaped |
| 3) Surface form of the substrate body | No texturing, Ra <1 nm |
| 4) Attained vacuum degree (Torr) | $10^{-7}$ or $10^{-9}$ (film formation chamber 2) $5 \times 10^{-9}$ (except in film formation chamber 2) |
| 5) Impurity concentration in the Ar gas | 10 ppb (same in all chambers) |
| 6) Ar gas pressure (mTorr) | 2 (same in all chambers) |
| 7) Temperature (° C.) at which the substrate body surface is maintained | 250 (same in all chambers) |
| 8) Target material (at %) | Cr, $Co_{83-y}Cr_{17}Ta_y$, C |
| 9) Diameter of the target (inches) | 6 |
| 10) Impurity concentration in the target (ppm) | 120 (Cr), 20 (CoCrTa) |
| 11) Distance between target and substrate body (mm) | 35 (Cr, CoCrTa, C) |
| 11) Power (W) applied to the target | DC, 200 (Cr, CoCrTa) DC, 400 (C) |
| 12) DC bias (−Volt) applied to the substrate body during film formation | 0 or 200 (Cr, CoCrTa) 0 (C) |
| 13) Film thickness produced (nm) | 2.5 (Cr), 1.6–28 (CoCrTa), 10 (C) |
| Substrate body cleaning treatment conditions | |
| 14) Power (W) applied to the substrate body | 200 |
| 15) Treatment time (sec) | 10 |
| 16) Ar gas pressure (mTorr) | 2 |

Figure 2:
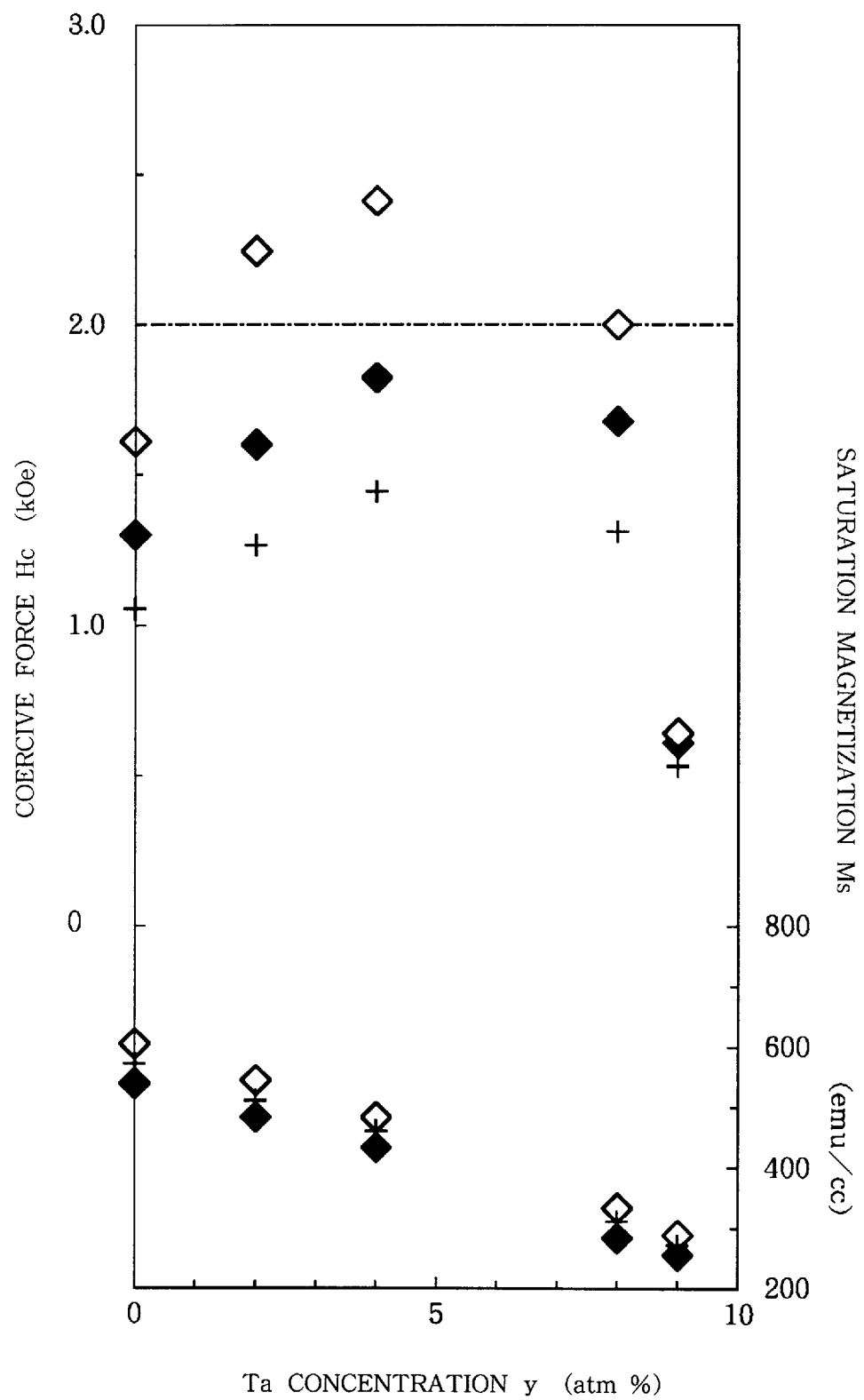
FIG. 2 is a graph showing the relationship between the coercive force Hc and the saturation magnetization Ms, and the Ta concentration in the CoCrTa film, of a magnetic recording medium in accordance with the second embodiment of the present invention.

FIG. 2 shows the magnetic characteristics of the media produced. The horizontal axis in FIG. 2 shows the Ta concentration in the CoCrTa film. The measurement of this Ta concentration was conducted using SIMS. The vertical axis in FIG. 2 indicates the saturation magnetization Ms [emu/cc] and the coercive force Hc [Oe] in the circumferencial direction of the sample. In FIG. 2, the conditions indicated by the ◇ symbol, the ♦ symbol, and the + symbol are as shown in Table 4 below.

TABLE 4

| Symbol | Attained Vacuum Degree (Torr) in Film Formation Chamber 2 | Bias [−V] During Formation of the Cr and CoCrTa Films |
| --- | --- | --- |
| ◇ | $3 \times 10^{-9}$ | 0 |
| ♦ | $3 \times 10^{-9}$ | 200 |
| + | $1 \times 10^{-7}$ | 0 |

The following three points are clear from FIG. 2.

(4) When formation was conducted in an ultraclean atmosphere and without applying a bias (◇ symbol), when the Ta concentration y [in atm %] in the CoCrTa film was within a range of 2–8, then it was possible to obtain a magnetic recording medium having a coercive force of 2000 Oe or more.

(5) When film formation was conducted in an ultraclean atmosphere (◇ symbol), the coercive force obtained was dramatically higher than that when film formation was conducted in a conventional atmosphere (+ symbol).

(6) When a bias was not applied (◇ symbol), the coercive force was higher than that obtained when a bias was applied (♦ symbol).

Accordingly, in magnetic recording media employing reversal of magnetization which are provided with a ferromagnetic metal layer comprising CoCrTa having an oxygen concentration of 100 wt.ppm or less, provided on a substrate body via a metallic undercoat comprising Cr having an oxygen concentration of 100 wt.ppm or less, by means of setting the composition of the ferromagnetic metal layer to chromium (Cr) in an amount of 17 atm %, tantalum (Ta) in an amount within a range of 2–8 atm %, and the balance comprising cobalt (Co), then it is possible to obtain a magnetic recording medium having superior magnetic characteristics without applying a bias to the substrate body.

It was learned, from the results of the first and second embodiments described above, that in magnetic recording media employing reversal of magnetization, which are provided with a ferromagnetic metal layer comprising CoCrTa having an oxygen concentration of 100 wt.ppm or less, provided on a substrate body via a metallic undercoat comprising Cr having an oxygen concentration of 100 wt.ppm or less, if the composition of the ferromagnetic metal layer is set to chromium (Cr) in an amount within a range of 14–23 atm %, tantalum (Ta) in an amount within a range of 2–8 atm %, and the balance comprising cobalt (Co), then it is possible to obtain a magnetic recording medium having superior magnetic characteristics without applying a bias to the substrate body.

Embodiment 3

In the present embodiment, a metallic undercoat comprising a Cr film, and a ferromagnetic metal layer comprising ($Co_{79}Cr_{17}Ta_4$) [atm %] were deposited in order using a sputtering method on a substrate body comprising a Al—Mg alloy plate having a NiP plating executed thereon, and when this was done, the value of the direct current bias applied to the substrate body was varied, and magnetic recording media were produced.

The value E of the direct current bias was altered within a range of 0–300 [–Volt]. Here, the attained degree of vacuum in the film formation chamber used for the formation of the ferromagnetic metal layer was fixed at approximately $10^{-9}$ Torr.

The other points were identical to those of Embodiment 1.

Table 5 shows the film formation conditions during the production of the magnetic recording media of the present embodiment. The production method of the magnetic recording media of the present embodiment is identical to that of Embodiment 1.

TABLE 5

| Item | Set Values |
|---|---|
| 1) Substrate body material | Al—Mg alloy (having thereon a 10-micron (Ni—P) plated film) |
| 2) Diameter and shape of the substrate body | 89 mm, disc-shaped |
| 3) Surface form of the substrate body | No texturing, Ra < 1 nm |
| 4) Attained vacuum degree (Torr) | $5 \times 10^{-9}$ (same in all chambers) |
| 5) Impurity concentration in the Ar gas | 19 ppb (same in all chambers) |
| 6) Ar gas pressure (mTorr) | 2 (same in all chambers) |
| 7) Temperature (° C.) at which the substrate body surface is. maintained | 250 (same in all chambers) |
| 8) Target material (at %) | Cr, $Co_{79}Cr_{17}Ta_{4}$, C |
| 9) Diameter of the target (inches) | 6 |
| 10) Impurity concentration in the target (ppm) | 120 (Cr), 20 (CoCrTa) |
| 11) Distance between target and substrate body (mm) | 35 (Cr, CoCrTa, C) |
| 12) Power (W) applied to the target | DC, 200 (Cr, CoCrTa) DC, 400 (C) |
| 13) DC bias (–Volt) applied to the substrate body,durinq film formation | 0–300 (Cr, CoCrTa) 0 (C) |
| 14) Film thickness produced (nm) | 2.5 (Cr), 16–28 (CoCrTa), 10 (C) |
| Substrate body cleaning treatment conditions | |
| 15) Power (W) applied to the substrate body | 200 |
| 16) Treatment time (sec) | 10 |
| 17) Ar gas pressure (mTotr) | 2 |

In FIG. 3, the surface roughness Ra of the media produced is shown. The horizontal axis in FIG. 3 indicates the direct current bias E [–Volt] applied to the substrate body during the deposition of the metallic undercoat and the ferromagnetic metal layer. The vertical axis in FIG. 3 indicates the surface roughness Ra [nm] of the sample.

It can be seen from FIG. 3 that the application of a smaller direct current bias E permits the formation of a medium having a smaller surface roughness, and when E is equal to 0, that is to say, when no bias is applied, the minimum value is obtained.

Figure 4:
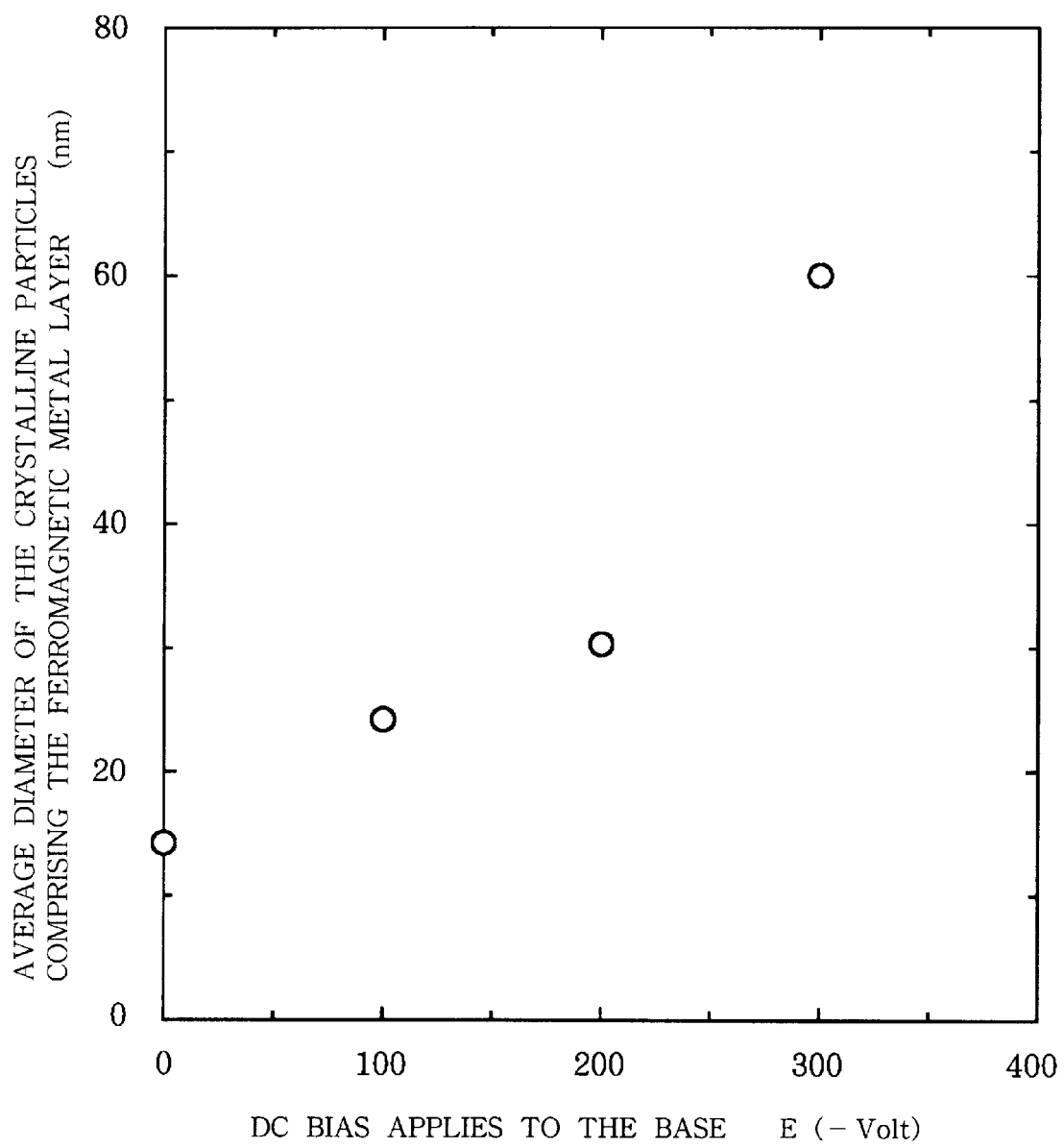
FIG. 4 is a graph showing the relationship between the average diameter of the crystalline particles comprising the ferromagnetic metal layer of a magnetic recording medium in accordance with the third embodiment of the present invention, and the direct current bias applied to the substrate body.

FIG. 4 shows the results of a measurement of the average particle diameter of the crystals comprising the ferromagnetic metal layer, from a TEM (transmission electron microscope) taken of the ferromagnetic metal layer of the media produced.

The TEM observation conditions are as shown in Table 6 below.

TABLE 6

<Sample production Method>

(1) Polishing was conducted with respect to the sample surface on which film formation had not been conducted, and the sample thickness was set to 10 microns.
(2) Next, ion milling was conducted from the surface of the sample on which film formation had not been conducted, and the sample thickness was set to 5 nm or less. The chief conditions were: Ar ion doping, 4.5 kV × 5 mA, angle of incidence of 15 degrees.
<TEM Observation Conditions>
(1) TEM employed: Hitachi HF2000
(2) Acceleration voltage: 200 kV
<Particle Diameter Observation Conditions>
(1) Magnification of the TEM image employed: 850000×
(2) Particle diameter measuring method: the outline of the crystalline particles was captured on an OHP sheet from the TEM image. This was scanned into a personal computer (a Macintosh LC 575). The average particle diameter was determined using image processing software ("NIH Image 1.56b18" by Wayne Rasband, National Institutes of Health, USA).

It can be seen from FIG. 4 that in cases in which a small direct current bias E is applied, the average particle diameter of the crystals comprising the ferromagnetic metal layer becomes smaller, and when E has a value of 0, that is to say, when no bias is applied, the smallest value is obtained.

Accordingly, it has been determined that by forming a magnetic recording medium having a ferromagnetic metal layer comprising a CoCrTa film having a component ratio in accordance with the present invention without applying a bias, not only are superior magnetic characteristics obtained, but it is also possible to realize a reduction in the head float height and a reduction in the noise of the medium. Furthermore, since it is possible to conduct film formation without applying a bias, it is clear that in the case of magnetic recording media having a ferromagnetic metal layer comprising a CoCrTa film having a component ratio in accordance with the present invention, it is possible to produce such a magnetic recording medium having superior magnetic characteristics not only when conductive substrate bodies comprising silicon and the like, which are desirable when attempts are made to make the magnetic recording medium thinner, are employed, but also when insulating substrate bodies such as glass or ceramics or the like are employed.

INDUSTRIAL APPLICABILITY

As described above, in accordance with the present invention, a magnetic recording medium having a low surface roughness and comprising a recording layer composed of magnetic particles having a small diameter, and having a high coercive force, and a manufacturing method for such media, are obtained.

What is claimed is:

1. A magnetic recording medium employing reversal of magnetization provided with a substrate body, a metallic undercoat comprising Cr having an oxygen content of 100 wt.ppm or less, and a ferromagnetic metal layer comprising CoCrTa having an oxygen content of 100 wt.ppm or less, wherein
the composition of said ferromagnetic metal layer contains chromium (Cr) in an amount within a range of 14–23 atm %, tantalum (Ta) in an amount within a range of 2–8 atm %, the balance comprising cobalt (Co).

2. A magnetic recording medium in accordance with claim 1, wherein the formation of said magnetic recording medium being characterized by said substrate body remaining substantially electrically unbiased at least during the formation of said ferromagnetic metal layer.

3. A magnetic recording medium in accordance with claim 1, wherein said substrate body has a disc shape, and wherein no concentric texturing treatment is provided on the surface of said substrate body.

4. A magnetic recording medium in accordance with claim 3, wherein the surface roughness of said substrate body is such that when roughness scanning is conducted in the radial direction of the disk, the average center line roughness Ra is smaller than 1 nm.

5. A magnetic recording medium in accordance with claim 1, wherein said substrate body comprises a conductive material.

6. A magnetic recording medium in accordance with claim 1, wherein said substrate body comprises an insulating material.

7. A magnetic recording medium in accordance with claim 5, wherein said conductive material comprises aluminum or alloy thereof.

8. A magnetic recording medium in accordance with claim 5, wherein said conductive material comprises titanium or an alloy thereof.

9. A magnetic recording medium in accordance with claim 5, wherein said conductive material comprises silicon.

10. A magnetic recording medium in accordance with claim 6, wherein said insulating material comprises one of glass, carbon, ceramic, plastic, resin, or a composite thereof.

11. A magnetic recording medium in accordance with claim 5, wherein a nonmagnetic layer is provided on said conductive material.

12. A magnetic recording medium in accordance with claim 6, wherein a nonmagnetic layer is provided on said insulating material.

13. A magnetic recording medium in accordance with claim 11, wherein said nonmagnetic layer comprises a (Ni—P) film produced by means of one of a sputtering method and a plating method.

14. A magnetic recording medium in accordance with claim 12, wherein said nonmagnetic layer comprises a (Ni—P) film produced by means of one of a sputtering method and a plating method.

* * * * *